Figures 1, 2:
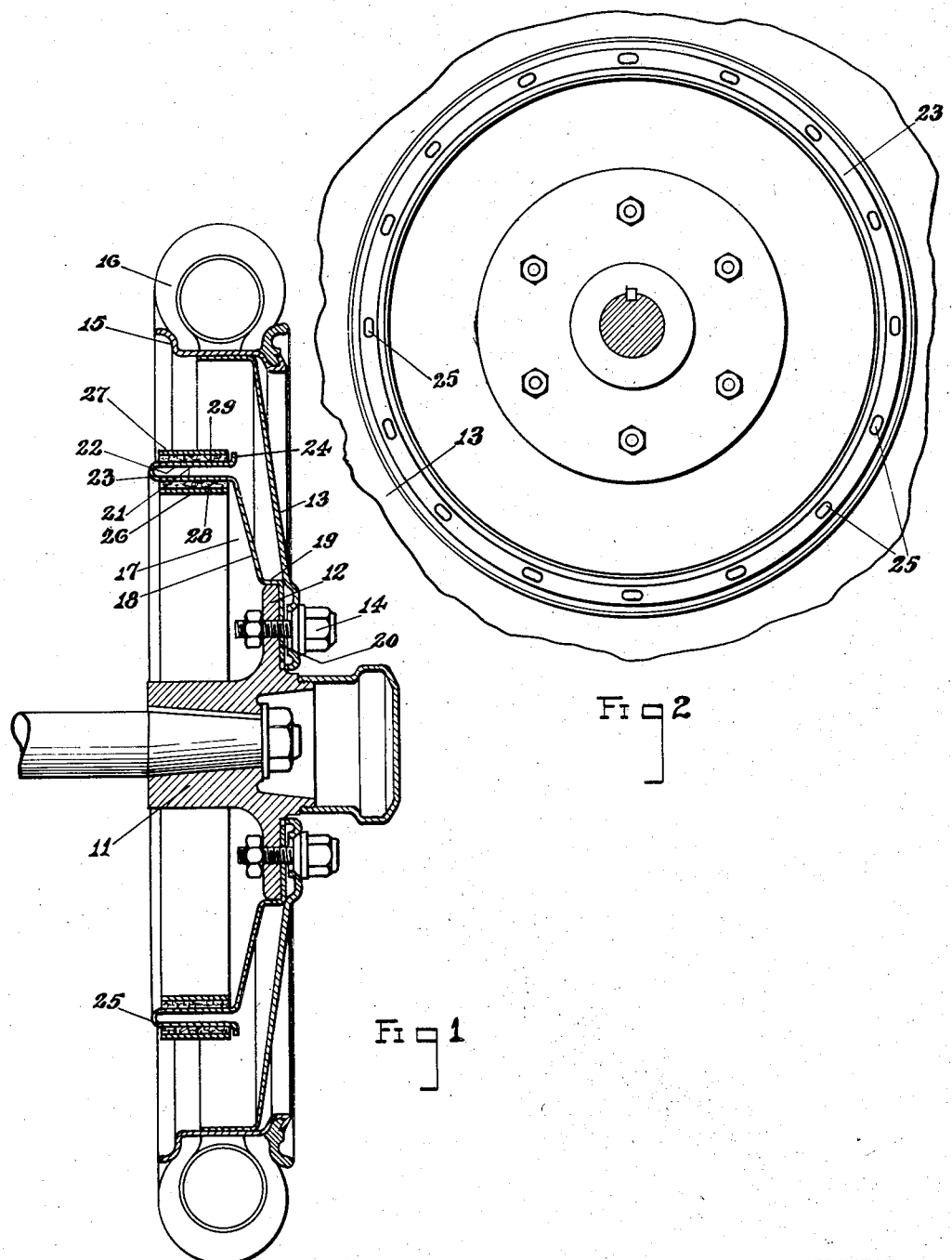

Nov. 3, 1925.

E. A. NELSON

VEHICLE BRAKE

Filed Oct. 2, 1923

1,559,583

WITNESS:—
Walter M. Trout

INVENTOR.
EMIL A. NELSON.
BY
ATTORNEY.

Patented Nov. 3, 1925.

1,559,583

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

VEHICLE BRAKE.

Application filed October 2, 1923. Serial No. 666,121.

*To all whom it may concern:*

Be it known that I, EMIL A. NELSON, a citizen of the United States, residing at Abington, Pennsylvania, have invented certain new and useful Improvements in Vehicle Brakes, of which I declare the following to be a full, clear, and exact description.

This invention relates to improvements in vehicle brakes and has to do more particularly with brake drum construction.

One of the objects of the invention is the provision of a brake drum adapted for use with two independent braking mechanisms, which will be efficient, light in weight and can be readily and economically manufactured. Another object of the invention is to provide a brake drum of such construction as to avoid excessive overheating while in use. A further object of the invention is to provide a brake drum which may be readily assembled with the members co-operating therewith and can be readily removed for inspection or replacement. Another object of this invention is to provide a brake drum which can be stamped or drawn from sheet metal and which has concentric braking surfaces for co-operation with independent braking mechanisms.

Further objects, and objects relating to details and economies of manufacture and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawing, forming a part of this specification, in which:

Fig. 1 is a central, transverse, sectional view through a rear wheel of an automobile, taken on line 1—1 of Fig. 2 and showing a practical embodiment of the invention; and Fig. 2 is a view in side elevation of the inner side of the wheel shown in Fig. 1, being taken on the plane indicated by line 2—2 of Fig. 1.

In the drawing, the same reference numerals refer to the same parts throughout the several views, and the sectional views are taken looking in the direction of the arrows at the ends of the section lines.

In general, my invention consists in providing a brake drum which may be stamped or drawn from sheet metal and which has a central portion, by which the drum may be attached to the hub of a wheel, and a pair of concentric, peripheral braking surfaces with which independent braking mechanisms may co-act. I propose to form spaced, concentric flanges on the periphery of the drum so arranged that an internal braking mechanism may co-act with one flange and an external braking mechanism may co-act with the other flange. These flanges being spaced, air may circulate between them so that they are easily kept cool and the heat generated by application of the brakes is readily dissipated. In order to promote the free circulation of air for cooling, I propose to provide ventilating openings in that portion of the drum connecting the braking surfaces or flanges.

In the drawing, I have shown a wheel comprising a hub, 11, having a flange, 12, thereon, a disc, 13, being secured to the hub by nuts, 14, screwed on studs, 10, which are carried by flange, 12, and pass laterally through the disk, 13. A rim, 15, upon which a pneumatic tire, 16, is mounted, is secured to the periphery of the disc, 13. It will be understood that the details of construction of these members constitute no part of the present invention, and the wheel may be of any of the well-known types in common use.

The brake drum, 17, is formed of sheet metal and comprises a central disc portion, 18, which is adapted to be rigidly fastened to the hub, 11, in any suitable manner, the portion, 18, being shown herein as having an annular shoulder, 19, formed to fit over the flange, 12, of the hub and an inner portion, 20, clamped against the flange, 12, by suitable bolts or rivets. At the periphery of the disc portion, 18, two spaced, concentrically arranged, annular portions or flanges, 21 and 22, connected by a lateral web portion, 23, are provided, the sheet metal being bent laterally from the disc portion, 18, then outwardly, and then laterally toward the plane of the disc. The edge of the outer flange, 22, is preferably formed with an outwardly-extending flange, 24, which reinforces and strengthens the structure.

The web portion, 23, which joins the annular friction-receiving portions or flanges, 21 and 22, is provided with circumferentially-spaced ventilating apertures, 25.

An inner brake member, 26, and an outer brake member, 27, having the usual linings, 28 and 29, are mounted in any manner desired for co-operation, respectively, with the inner surface of annular flange, 21, and the outer surface of annular flange, 22, of the brake drum. One of these brake members may be the service brake and the other the emergency brake.

By providing a brake drum with spaced, concentric, braking flanges for engagement by the internal and external brakes, circulation of air is permitted between said flanges and excessive overheating when the brakes are applied will be prevented. The ventilating apertures, 25, assist materially in promoting such cooling action.

The brake drum as a whole may be removed after the wheel has been removed from the hub, the annular brake flanges, 21 and 22, sliding out from between the brakes, 26 and 27, and, when the parts are assembled, the engagement of the shoulder, 19, with the periphery of the hub flange, 12, insures accurate positioning of the drum. This brake drum is light but strong and can be manufactured at low cost.

It will be apparent that the invention may be applied to wheels of types other than that herein shown and described, and that other means of attaching the brake drum to the wheel may be employed. Such changes and similar changes in the details of construction may be made without departing from the spirit of the invention which are defined in the appended claims.

The invention having been thus described, what I claim as new and useful and desire to secure by Letters Patent is:

1. A brake drum comprising a portion by which it may be supported, spaced friction-receiving portions, and a continuous portion connecting said friction-receiving portions, said connecting portion having ventilating apertures therein.

2. A brake drum comprising a disc having its outer edge bent laterally and then backwardly to form a pair of spaced, concentrically-arranged annular braking flanges.

3. A brake drum comprising a main body portion, an annular friction-receiving portion at the outer periphery of said body portion, a second friction-receiving portion spaced from and concentrically arranged with respect to said first mentioned annular friction-receiving portion, a supporting means between said annular portions whereby the space between the outer surface of said first mentioned portion and the inner surface of said second mentioned portion is maintained entirely free from any obstruction.

4. In a brake drum, a pair of spaced, annular concentrically arranged braking flanges and a portion connecting one edge of one of said flanges with the corresponding edge of the other of said flanges.

5. In a brake drum, a supporting body therefor, and an annular channeled portion at the outer periphery of said supporting body, having its open end in a plane substantially in the plane of said outer periphery and its closed end in a plane substantially offset from said first mentioned plane.

6. In a brake drum, a disc having an annular channel pressed therein laterally of its body, whereby to form spaced concentrically arranged annular braking flanges.

In testimony whereof, I affix my signature.

EMIL A. NELSON.